Figure 1:
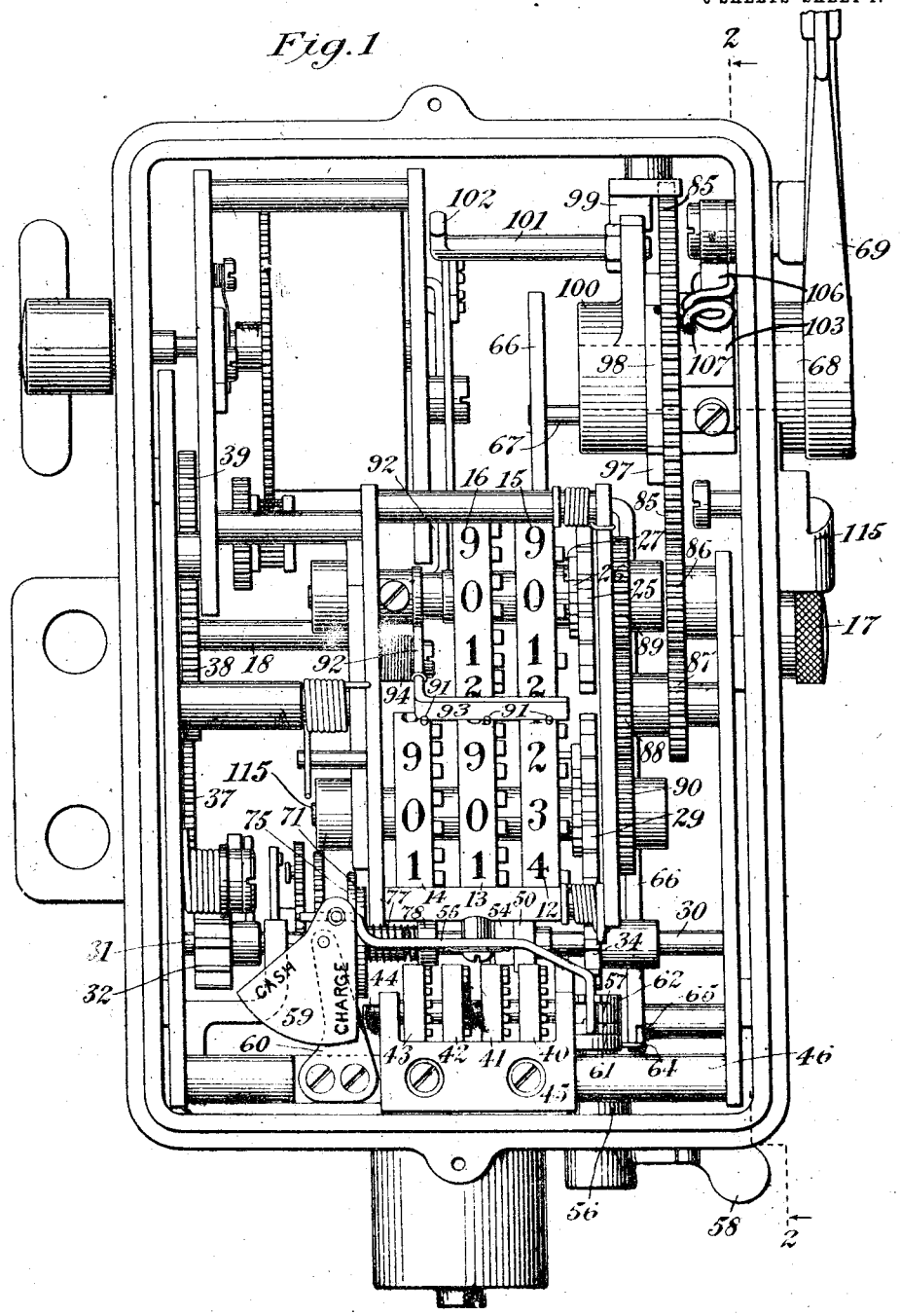

B. VOLKMAR.
FARE REGISTER.
APPLICATION FILED JULY 15, 1910.

1,053,253.

Patented Feb. 18, 1913.
6 SHEETS—SHEET 2.

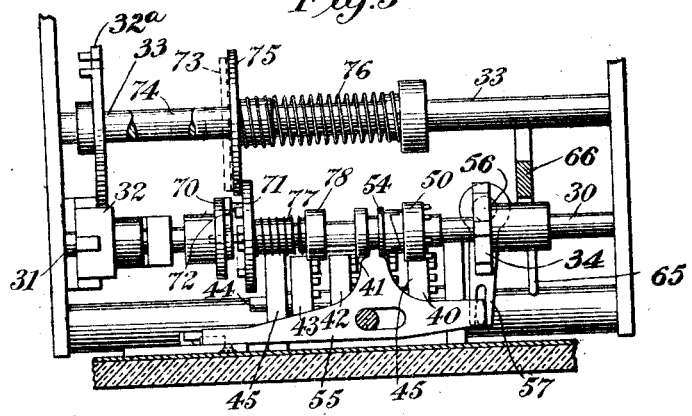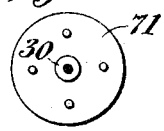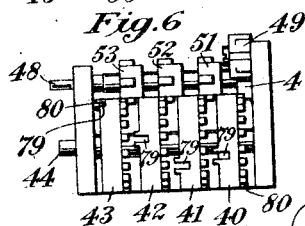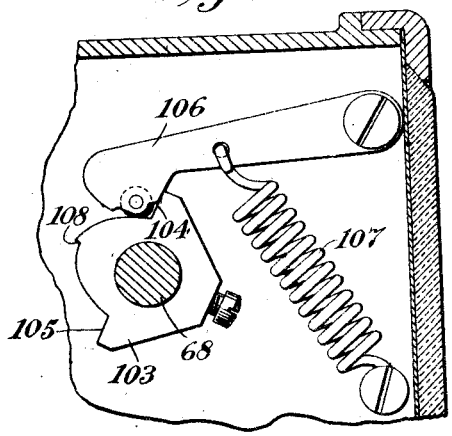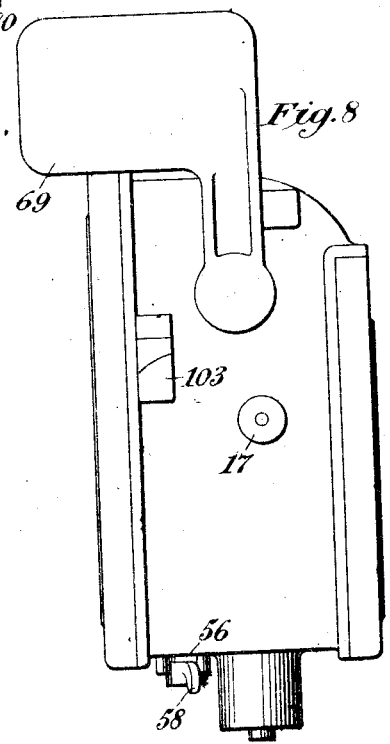

B. VOLKMAR.
FARE REGISTER.
APPLICATION FILED JULY 15, 1910.
1,053,253.
Patented Feb. 18, 1913.
6 SHEETS—SHEET 4.
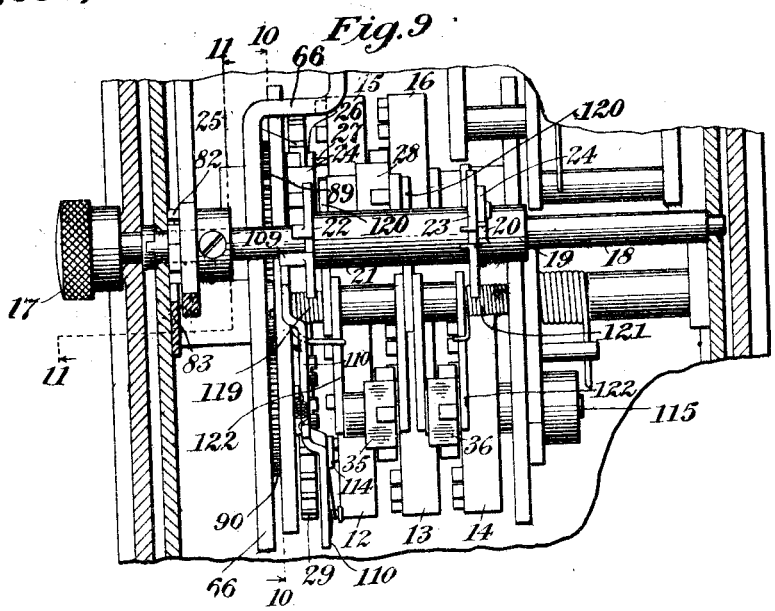
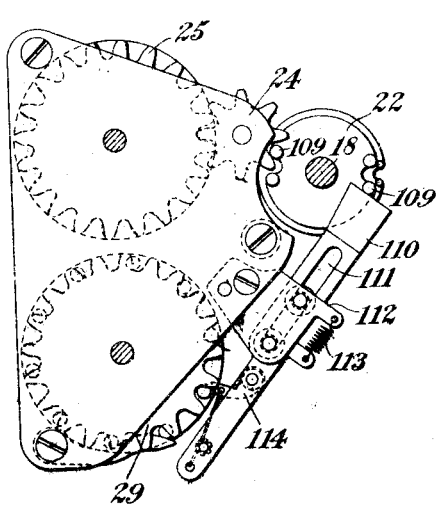
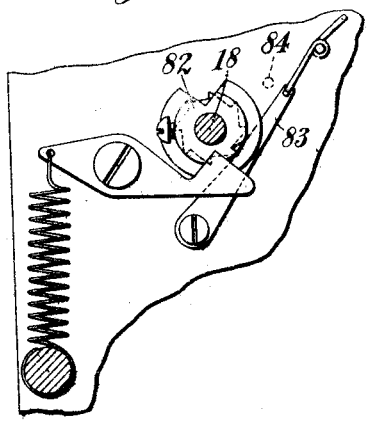
Witnesses.
Inventor
Bernhard Volkmar
By his Attorney B. VOLKMAR.
FARE REGISTER.
APPLICATION FILED JULY 15, 1910.
1,053,253.
Patented Feb. 18, 1913.
6 SHEETS—SHEET 5.
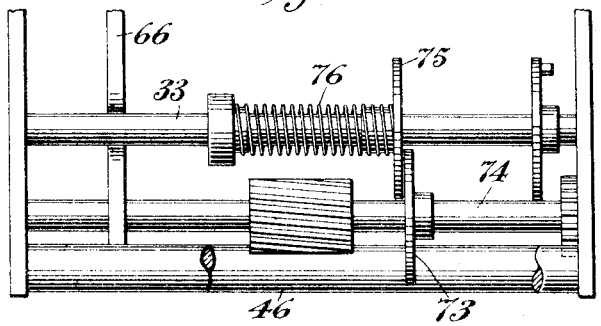
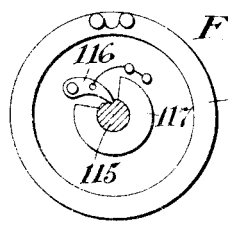
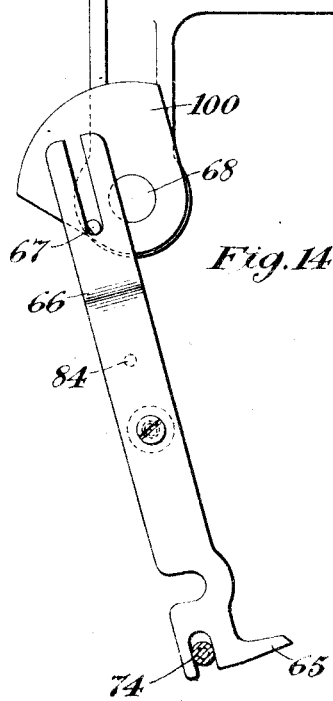
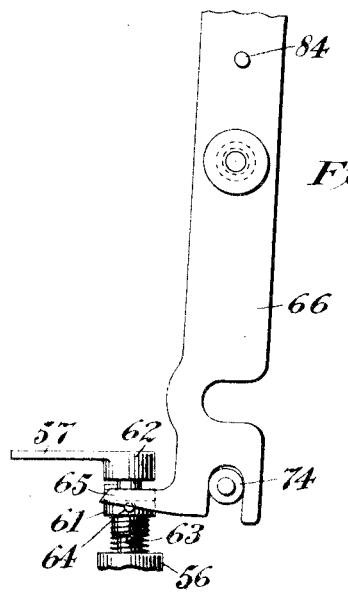
Witnesses:
Victor D. Borst
Wm. Ashley Kelly
Inventor
Bernhard Volkmar
By his Attorney
Henry D. Williams

UNITED STATES PATENT OFFICE.

BERNHARD VOLKMAR, OF NEW YORK, N. Y., ASSIGNOR TO CONRAD HUBERT, OF NEW YORK, N. Y.

FARE-REGISTER.

1,053,253.	Specification of Letters Patent.	Patented Feb. 18, 1913.

Application filed July 15, 1910. Serial No. 572,118.

*To all whom it may concern:*

Be it known that I, BERNHARD VOLKMAR, a citizen of the United States of America, residing in the borough of the Bronx, city of New York, in the county of New York and State of New York, have invented a certain new and useful Improvement in Fare-Registers, of which the following is a specification, reference being had therein to the accompanying drawings, forming part thereof.

My invention relates to automatic fare registers of the kind commonly known as taximeters. Such registers usually have an indicator of the fare in dollars and cents which is capable of being reset to its initial indication at the end of each trip, and a totalizer of all the fares, which cannot be reset, and these, with the exception of an indicator for extras, are the only indicators provided for the fare, and it is impossible to differentiate between different kinds of fare, as, for instance, between a cash fare and a fare which is charged to the account of a customer and known as a charge fare. For example, if a driver is shut out to carry a charge passenger and while out, his vehicle is engaged by a cash passenger, the totalizer indicates how much the two fares aggregate, but there is no way for the owner of the vehicle to know how much the separate fares were, and a dishonest driver may add to the amount of the charge fare and deduct it from the cash fare and keep the amount deducted and added without fear of detection unless the charge passenger remembers the amount of his particular charge.

One of the objects of my invention is to obviate this by providing easy and simple means for indicating charge fares independently of fares of other classes.

Furthermore in devices of this class, particularly those which use number wheels, which have the numbers on the peripheries of the wheels, and which have some advantageous means for resetting, as by the movement of the sign, the centrifugal force of the number-wheels which is imparted to them by the resetting movement, is apt to carry them past their correct position.

Another object of my invention is to provide simple and reliable means for positively stopping the number-wheels in their correct position when they are reset.

Another object of my invention is to provide novel and simple means for actuating the individual trip fare indicator when the extras indicator is actuated, the fare indicator being an indicator of both the fare and the extras.

Another object of my invention is to provide simple means for locking the extras indicator against actuation when the taximeter is not in operative condition, and to unlock the extras indicator when the taximeter is placed in operative condition.

Another object of my invention is to provide reliable means for locking the sign in its different positions which at the same time will permit the flag to be moved readily from one position to another.

My invention also includes several details of construction and combinations of parts, and has other objects and advantages as will hereinafter more fully appear.

I shall now describe my invention with reference to the accompanying drawings and shall thereafter point out my invention in claims.

Figure 2:
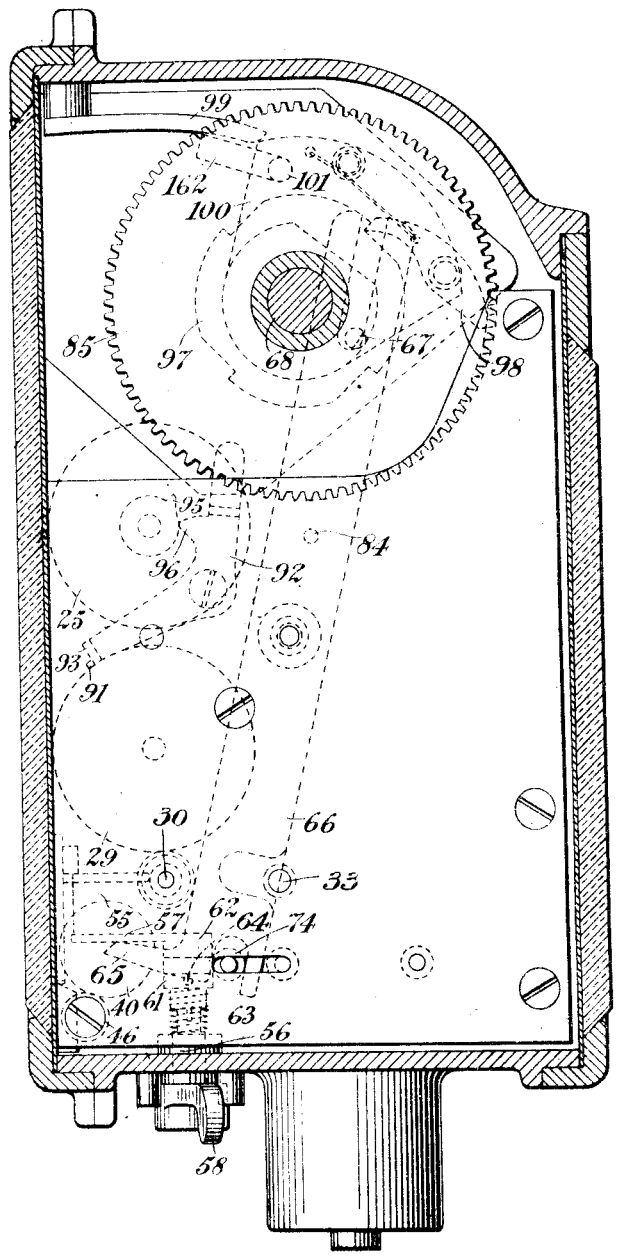
Figure 16:
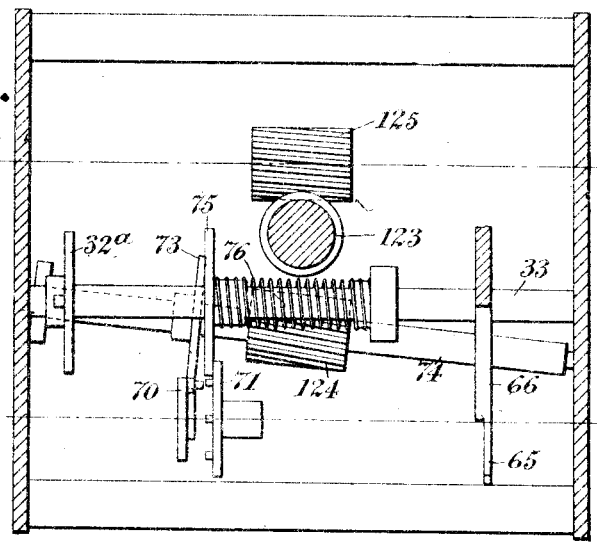
Figure 17:
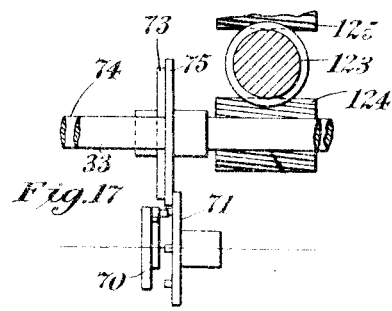

Figure 1 is a front elevation of a taximeter embodying my invention, the front dial being removed. Fig. 2 is a vertical sectional elevation of the parts shown in Fig. 1, taken on the line 2—2, looking toward the left. Fig. 3 is a detail plan view of the charge account indicator and its coöperating parts. Fig. 4 is a detail elevation of the pin wheel of the clutch of the charge account and fare indicators looking from the left of Fig. 3. Fig. 5 is a detail elevation of the coöperating clutch wheel looking from the right of Fig. 3. Fig. 6 is a detail plan view of the number-wheels and transmitting pinions of the charge account indicator. Fig. 7 is a sectional detail showing the sign locking mechanism. Fig. 8 is a left side elevation on a reduced scale of my taximeter casing and parts thereon. Fig. 9 is a detail rear view of the extras and fare-and-extras indicators and the manual actuating mechanism therefor. Fig. 10 is a side view of the indicators taken on line 10—10 of Fig. 9 looking toward the right. Fig. 11 is a detail of the locking device for the extras setting mechanism, taken on line 11—11 of Fig. 9, looking toward the left. Fig. 12 is a rear elevation of the parts shown in Fig. 3. Fig. 13 is a detail face view of the first fare- and-extras number-wheel, showing its shaft in section, illustrating the means for resetting. Fig. 14 is a detail in elevation on a reduced scale of the sign and shifting lever, showing the connections between them. Fig. 15 is a detail elevation of the lower end of the shifting lever and the clutch in the charge register controlled thereby. Figs. 16 and 17 are diagrammatic views on an enlarged scale, corresponding to Fig. 3 and showing the two positions of the shiftable parts somewhat exaggerated. Fig. 16 shows these parts in non-operative position, and Fig. 17 shows the main parts thereof in operative position.

I have shown my invention as employed in connection with a taximeter which I invented and for which I have applied for United States Letters Patent on October 9, 1909, Serial Number 521,920. This taximeter operates wholly on the rotary principle, but it is evident that my invention is equally adaptable to any taximeter. In the illustrated taximeter, the fare-and-extras and an extras indicator are shown, the former having three number-wheels, 12, 13 and 14, denoting tens, hundreds and thousands, respectively, and the latter having two number-wheels, 15 and 16, denoting tens and hundreds respectively, a blind zero denoting units being provided on the dial for each indicator. To set the extras indicator, a knob 17 is provided outside of the casing, which is secured on the end of a shaft 18 on which is fixed a collar 19 having a tooth 20 thereon. A sleeve 21 is also mounted on the shaft 18 and suitably held against longitudinal movement while free to rotate thereon. Fastened to the ends of the sleeve 21 are the pinions 22 and 23, respectively, each having two tooth-engaging notches, and the latter carrying an abutment device 24 in position to be engaged by the tooth 20. The rotation of the shaft 18 and collar 19 therefore rotates the sleeve 21 and the two pinions 22 and 23. (The pinion 23 actuates a total extras register (not shown) and the pinion 22 meshes with a driving pinion 24, which meshes with a gear wheel 25. This gear-wheel is connected to the first number-wheel 15 through a pawl on the gear wheel and a ratchet 26, which ratchet is fastened to the first number-wheel 15 by a pin 27 (see Fig. 1). Actuation is transmitted from the first to the second number-wheel through an intermittently driven transmitting pinion 28 which is held in yielding engagement with the two number-wheels to permit them to be rotated together to reset, the yielding being permitted by a spring 119, which surrounds the shaft on which are pivoted the arms 120 carrying the shaft of the pinion 28, one end of which spring bears against the arm 120 shown at the left in Fig. 9. The fare-and-extras indicator also has a gear wheel 29 corresponding to the gear wheel 25 in the extras indicator and similarly connected to the first number-wheel 12. To actuate the gear wheel 29, transmitting means are provided to transmit actuation from vehicle and chronometer driven actuating means. The transmitting means comprise a shaft 30 alined with a shaft 31 and connected therewith by clutch mechanism which will be hereafter described. The shaft 31 is provided with a pinion 32, which has alternate full-width and half-width teeth and which coöperates with an actuating pinion 32ᵃ on the shaft 33 having one tooth-engaging notch (see Fig. 3), and the shaft 30 is also provided with another pinion 34 which meshes with the gear wheel 29. Therefore, as the actuating means actuate the transmitting means, the first number-wheel 12 is actuated, and intermittently driven transmitting pinions 35 and 36, similar to the one used in the extras indicator, are employed to transmit actuation from the number-wheels of lower to those of higher denomination and are similarly held in yielding engagement to permit the number-wheels to be simultaneously rotated to reset. The springs 119 and 121 bear with one end against the pivoted arms 122 which carry the shafts of the pinions 35 and 36 and permit them to yield similarly to the pinion 28, as explained above. The actuating means are mounted on the shaft 33, which is rotated by the movement of the vehicle through means (not shown) connected to one of the vehicle wheels; and when the speed of the vehicle falls below a certain minimum, a clock train 37, 38 and 39, becomes effective in the usual way and drives the actuating means. An intermittent driving wheel (not shown), having one tooth-engaging notch and mounted on the shaft 33, meshes with the pinion 32 and actuates the pinion one full-width tooth for every complete rotation of the intermittent driving wheel.

To differentiate charge from cash fares, an auxiliary charge account indicator is added which is shown as located below the fare-and-extras indicator and driven by the same transmitting means, though it is evident that independent actuating means could be employed; and in connection with this auxiliary indicator manually operated means are provided for throwing it into and out of operative connection with the actuating means. To prevent any shifting from charge to cash or vice versa after once the taximeter has been started in operation and before it is thrown out again, other means are provided to render the manually operated throwing means inoperative while the taximeter is in operative condition. The charge account indicator has four number-wheels, 40, 41, 42 and 43, which are loosely mounted on a shaft 44 having bearings in the supporting arms of a bracket 45 attached to a post 46. To actuate the first number-wheel 40, a small pinion 47 mounted on a shaft 48 parallel with shaft 44 and having bearings in the arms of the bracket 45, meshes with laterally projecting pins on the side near the periphery of the number wheel 40. To drive the pinion 47, an intermediate pinion 49 meshes with it and is in turn driven by a pinion 50 which is loose on the transmitting shaft 30. Therefore as the pinion 50 is rotated, the first number-wheel 40 is actuated, and to transmit actuation from the lower number-wheels successively to those of higher denomination, intermittently driven transmitting pinions 51, 52 and 53 are employed, mounted on the shaft 48 and similar to the transmitting pinions in the fare-and-extras indicators. These pinions, like the pinion 32, have alternate full-width and half-width teeth, four of each, and each of the number wheels has on its periphery a tooth-engaging notch 79. On each side of the tooth-engaging notches 79 is a laterally-projecting pin or lug 80, as shown in Fig. 6. The intermittently driven pinions in locked position ride with two adjacent full-width teeth on the periphery of the driving wheel and with the intermediate half-width tooth projecting along the side in the path of the lugs 80. The number-wheels also have, adjacent to their peripheries, laterally-projecting pins 81, two for each numeral on the side opposite that from which the lugs 80 project, so that the half-width teeth of the pinions extend down between two of the pins 81. As the number-wheels of lower denomination are actuated, each lug 80 in advance engages the narrow tooth of its respective pinion, and the rear full-width tooth rolls down between the lugs 80 and into the notch or tooth 79. The further rotation of the number-wheels carry that full-width tooth up on the periphery and the one behind it now also rests on the periphery and the intermediate narrow tooth is in the path of the lugs 80, and the two full-width teeth lock the intermittently driven pinion against further actuation until the advance lug of the number-wheel in its rotation strikes the narrow tooth in its path. This rotation of the intermittently driven pinions, by the cooperation of the teeth and the pins 81, rotates the number-wheels of higher denomination two pins or one number with each actuation of the pinions.

To connect the pinion 50 to the shaft 30 and hence to operatively connect the charge account register just described to the actuating mechanism, a suitable manually operated clutch and clutch shifting mechanism is employed. This mechanism consists of the sliding clutch 54 splined on the shaft 30 and adapted to engage the pinion 50, the sliding clutch actuating member 55 adapted to slide the clutch 54 back and forth, and the rocking shaft 56 which has an arm 57 bifurcated at its forward end and straddling a downwardly extending projection at the end of the sliding member 55. The shaft 56 extends through the lower end of the casing and a small crank 58 is attached thereto for manually operating the clutch, two stop-pins being provided to limit its rotational movement. A sector shaped sign 59 is attached to the sliding actuating member 55 and pivoted on a bracket arm 60 so that the actuation of the sliding actuating member 55 moves the sign 59 one way or the other to display either "Cash" or "Charge" through an opening in the dial, as indicated in Fig. 1. To prevent the charge account from being tampered with after the taximeter has started, means are provided for rendering this clutch actuating mechanism inoperative, which means are operated by the shifting mechanism employed to throw the taximeter into operation. These means include a clutch 61 on the shaft 56. The arm 57 is carried on a collar 62 which is loose in the shaft 56. The sliding clutch 61 is splined or keyed on the shaft 56 and is normally held in engagement with the collar 62 by a helical thrust spring 63 surrounding the shaft 56 and bearing with its upper end against the clutch 61 and with its lower end against a shoulder on the shaft 56, as shown. The clutch 61 carries a laterally extending pin 64 and when this pin is forced down the clutch is disengaged. To force down the pin and disengage the clutch 61, a projecting arm 65 on a shifting lever 66 bears against the pin 64 and when the lever 66 is shifted to throw the taximeter in operation, the arm 65 presses the pin 64 down and disengages the clutch 61, and when the lever 66 is shifted in the opposite direction to throw the taximeter out of operation, the pin 64 is released and the spring 63 engages the clutch. The lever 66 is operated by a crank pin 67 on the sign shaft 68, and therefore when the sign 69 is lowered, the condition of the charge account registering mechanism cannot be changed.

The illustrated device is adapted to register thirty cents as the minimum fare shown at the initial setting, though this can easily be changed to register any desired amount. This thirty cents is for the first half mile, or any fraction thereof, and since the mechanism registers ten cents for each quarter of a mile in advance, the fare register and the total fare units register are each actuated one unit or ten cents at the completion of the first half mile, but this actuation is deferred until the completion of the first half mile. The means for deferring the actuation for both the charge account and fare-and-extras indicators comprise the clutch mechanism between the alined shafts 30 and 31 which is adapted to permit the first actuation of the shaft 31 and pinion 32 to be idle as regards the shaft 30. The clutch mechanism consists of a clutch-wheel 70 fast on the end of the shaft 31 and a coöperative pin-wheel 71 splined on the end of the shaft 30, and normally held in contact with the clutch-wheel by a thrust spring 77 coiled about the shaft 30 and bearing with one end against the pin-wheel 71 and with the other against a collar 78 on the shaft 30. A clutch member 72 is pivoted on the face of the clutch wheel, two stop-pins being provided to limit its oscillation, and a spring tends to rotate it ahead to the position shown in Fig. 5, against the forward stop. The pin-wheel 71 has four equally spaced pins on its face in the path of the clutch 72. As the clutch wheel is rotated the clutch engages one of the pins on the pin wheel which rotates the clutch back against the back stop-pin, after which the clutch wheel carries the pin wheel along in its rotation. A shifting disk 73 is rigidly mounted on a bodily axially movable shaft 74, which is shifted by the shifting lever 66 to throw the taximeter into and out of operation. This shaft 74 is driven by a worm 23 which is rotated by a flexible shaft (not shown) driven from a vehicle wheel, and which meshes with a worm wheel 124 on the shaft 74 when the shaft is in operative position, and with a similar worm wheel 125 on a bodily stationary shaft (shown in dotted lines in Fig. 2), from which the total registers are driven. The shifting disk 73 extends along the side of an intermediate shifting disk 75 which extends at the side of the pin-wheel 71. As the sign 69 is raised and the axially movable shaft 74 shifted by the shifting lever 66, the shifting disk 73 by its bodily movement engages and moves the disk 75 against the tension of a spring 76 coiled about the shaft 33, which disk in turn forces back the pin-wheel 71 against the tension of the spring 77, thus releasing the clutch 72 from the pin on the pin-wheel with which it is in engagement, and the spring immediately carries the clutch 72 ahead of the pin and against its forward stop-pin. Consequently as the axially movable shaft 74 is again moved back into operative position, the shifting disks permit the pin-wheel 71 to return to its original position, but the clutch 72 is now ahead of the pin on the pin wheel with which it was formerly in engagement, and consequently the clutch wheel has one idle actuation after the vehicle is started until the clutch engages the next pin; in other words, the actuation for the first quarter of a mile is not registered either in the charge account or fare indicator; but the next actuation at the completion of the next quarter of a mile is registered, with the result that the third quarter of a mile is registered in advance at the end of the first half mile.

In the illustrated taximeter the resetting of the number-wheels in the extras and fare-and-extras indicators is done at the same time by lowering the sign 69 which rotates the number-wheel shafts to aline the number-wheels through the gear wheels 85, 86, 87, 88, 89 and 90. (See Fig. 1). Fig. 13 illustrates the means for resetting the fare-and-extras register, and as the extras register is reset the same way, a description of the one will suffice for both. The number-wheel shaft 115 is provided with a single longitudinal groove, and on each number-wheel is a spring-pressed pawl 116, as is shown in Fig. 13 on the first fare-and-extras number-wheel 12. The number-wheels are all provided with a spacing hub 117, a portion of which is cut away, as shown, to permit the pawl 116 to engage the shaft 115. These pawls are so set that they take in the groove in the shaft when the number-wheels indicate the desired reading, which is zero unless some initial minimum fare is to be registered, in which case the pawl on the first number-wheel 12 is set accordingly. When the number-wheels are rotated about the shaft to register the fare or extras, to the left or counter-clock-wise as shown in Fig. 13, the pawls 116 ride out of their grooves and around their shaft idly; but when the shaft is rotated in the same direction, it will pick up the wheels and aline them through the medium of the pawls and groove. This rotation of the number-wheel shaft 115, and also of the extras number-wheel shaft, is effected through the lowering of the sign, as previously stated, through the train of gears 85, 86, 87, 88, 89 and 90, as appears in Fig. 1.

When the sign is quickly lowered this rotation of the number wheels imparts to them a momentum which is apt to carry them past their proper position. The frictional resistance of those in the extras register may be adjusted to prevent this, since it is set by hand, but the frictional resistance cannot be increased beyond a certain point in the fare-and-extras register, since their actuation must be easy enough so as not to impede the automatic actuating mechanism, particularly the clock mechanism. To prevent the fare-and-extras number-wheels from being thus carried past their proper position when reset, I provide an automatic stop mechanism. This stop mechanism consists of a stop-pin 91 properly located on the periphery of each of the number-wheels 12, 13 and 14, and a bell-crank lever 92 pivoted to the side plate of the frame of the fare-and-extras and extras indicators, and having a stop-arm 93 extending substantially at right angles to the lever 92 and across the peripheries of the fare-and-extras number-wheels and adapted to lie in the path of the stop-pins 91. A spring 94 is coiled about the pivot of the bell-crank lever 92 and is fastened at one end to the pivot and at the other to the lever 92 and tends to hold the stop-arm 93 down on the peripheries of the number-wheels 12, 13 and 14 in the path of the stop-pins 91.

To provide means for temporarily raising the stop-arm 93 to permit the stop-pins 91 to pass it at the beginning of the resetting movement, I employ a cam 95 on the shaft of the extras number-wheels so located that it will engage a nose or projection 96 on the rear arm of the bell-crank lever 92 at the beginning of its movement when it is rotated through the resetting means previously described. As soon as the cam 95 rides off the nose 96, the spring 94 returns the stop-arm 93 to its stop position. The number-wheels are rotated and are properly alined just as the pins 91 reach the stop-arm 93, at which point the resetting actuation caused by the lowering of the sign ceases and the presence of the stop-arm in the path of the pins 91 prevents the number-wheels from being rotated farther by reason of their momentum. To raise the stop-arm 93 from the path of the pins when the resetting is completed and the taximeter starts in operation, I provide means for disengaging the sign shaft from the resetting means at the end of the resetting, and for utilizing a little further downward movement of the sign in raising the stop-arm 93. The gear-wheel 85 is connected to the sign-shaft 68 by a ratchet 97 fast on the sign-shaft 68 and a pawl 98 on the gear wheel 85, the rear end of which is located in the path of the pawl-disengaging member 99 and so positioned that pawl 98 in the rotation of the gear wheel 85 reaches the pawl disengaging member 99 and is disengaged from the ratchet 97 just at the conclusion of the resetting of the number-wheels. The same crank member 100 which carries the crank pin 67 which operates the shifting-lever 66 also carries an inwardly projecting arm 101, which has its inner end bent at an angle as shown in Figs. 1 and 2, which bent portion serves as a stop-releasing arm. This is so located that the releasing-arm 102 just reaches the inner end of the bell-crank lever 92 as the number-wheels are alined. At this point the sign 69 has not yet reached its lower stop 115, and as the sign is continued in its downward movement, the pawl-disengaging member 99 first releases the pawl 98 so that the resetting means are not actuated any farther, and the remainder of the downward movement of the sign is utilized by the depression of the rear arm of the bell-crank lever 92 by the stop-releasing arm 102 and the consequent raising of the stop-arm 93 out of the path of the pins 91, and this condition remains as long as the flag is down and the taximeter is in operation. When the flag is raised and the taximeter thrown out of operation, the bell-crank lever 92 is released and the spring 94 returns the stop-arm 93 into the path of the stop-pins 91.

To hold the sign in its upper and lower positions, and in an intermediate position, I provide a stop mechanism illustrated in Fig. 7. This consists of a stop member 103 fixed on the sign shaft 68 and having a portion curved substantially concentrically with the sign shaft for an arcuate distance substantially equal to the arc of movement of the sign, which is a little over 90 degrees, and having stop shoulders 104 and 105 for the upper and lower positions of the sign respectively. A pressure member 106 having an anti-friction roller on its bearing face, is held against the curved face of the stop-member 103 by a retractile spring 107, and serves to retard the rotation of the sign shaft. The curved portion of the stop-member is somewhat thicker at its center than at its ends, or, in other words, is somewhat elliptical in shape, and hence the spring 107 is under the greatest tension at the middle position and therefore tends to hold the sign up or down. An intermediate stop shoulder 108 is provided at or about the center of the curved space of the stop-member 103, so that the sign may be raised half way up and held there in case of repairs or any stop for any other cause for which the passenger should not pay for waiting time. When the sign is raised half way up, the taximeter is thrown out of operation, while the lowering of the sign will not reset the number-wheels and register another initial fare, since the pawl 98 has not engaged a new tooth in the ratchet 97.

To provide means for locking the extras indicator against setting except when the taximeter is in operative condition, a ratchet 82 is fixed on the shaft 18 (see Figs. 9 and 11) and a spring pressed pawl 83 normally engages in the ratchet and locks the shaft 18. To disengage the pawl 83 from the ratchet 82, the shifting lever 66 carries a pin 84 (indicated in dotted lines in Figs. 2 and 11) and when the sign 69 is lowered, the pin 84 is shifted and strikes the projecting end of the pawl 83 and disengages the pawl from the ratchet 82.

As previously stated, the trip fare indicator which includes the number-wheels 12, 13 and 14, is a fare-and-extras register, or, in other words, when the extras register is set, it also registers in the fare-and-extras register. Figs. 9 and 10 illustrate the means which I employ for effecting this. The pinion 22 on the setting shaft 18 has, as usual, a laterally extending pin on each side of each tooth-engaging notch to engage with the half-width teeth on the intermediate pinion 24, but in this case each forward pin 109 is longer than its complementary pin and extends in the path of an actuating sliding member 110 provided with a slot 111 arranged to slide over guide pins in a bracket 112, as shown in Fig. 10. The actuating member 110. is normally held in its upper or retracted position by a retractile spring 113 and carries a spring pressed dog 114 normally held against a stop pin in position to engage one of the ten laterally extending pins near the periphery on the outer face of the first number-wheel 12 of the fare-and-extras indicator. As the pinion 22 is rotated the actuating member 110 is pressed down twice for each complete rotation of the pinion 22 by the pins 109 and the number wheel 12 thereby actuating two members. As this setting can occur only when the sign is down and the pawl 83 is disengaged from the ratchet 82, it is evident that the stop-arm 93 is always out of the path of the pins 91 when the extras are set.

It is obvious that various modifications may be made in the construction shown and above particularly described within the principle and scope of my invention.

I claim:

1. In a fare register for vehicles, an individual trip fare indicator, actuating mechanism therefor permanently connected thereto, an auxiliary indicator adapted to be operatively connected to the actuating mechanism of the individual trip fare indicator, clutch shifting means for operatively connecting the auxiliary indicator with and disconnecting it from the actuating mechanism, and means for deferring the actuation of the two indicators for a predetermined period.

2. In a fare register for vehicles, in combination with shifting means for throwing the fare register into and out of operation, a fare indicator, actuating mechanism for the fare indicator, an auxiliary indicator adapted to be operatively connected to the actuating mechanism, engaging means for operatively connecting the auxiliary indicator with and disconnecting it from the actuating mechanism, and means operated by the shifting means for rendering the engaging means inoperative.

3. In a fare register for vehicles, in combination with shifting means for throwing the fare register into and out of operation, a fare indicator, actuating mechanism for the fare indicator, an auxiliary indicator adapted to be operatively connected to the actuating mechanism, a clutch for operatively connecting the auxiliary indicator to the actuating mechanism, manually operated means for engaging and disengaging the clutch, and means operated by the shifting means for rendering the engaging means inoperative.

4. In a fare register for vehicles, in combination with shifting means for throwing the fare register into and out of operation, a fare indicator, actuating mechanism for the fare indicator, an auxiliary indicator adapted to be operatively connected to the actuating mechanism, a clutch for operatively connecting the auxiliary indicator to the actuating mechanism, manually operated means for engaging and disengaging the clutch, a second clutch for connecting the manually operated means to the first clutch, and means operated by the shifting means for engaging and disengaging the second clutch.

5. In a fare register for vehicles, in combination with shifting means for throwing the fare register into and out of operation, a fare indicator, actuating mechanism for the fare indicator, a charge account indicator, a clutch for operatively connecting the charge account indicator to the actuating means, manually operated means for engaging and disengaging the clutch, an indicator of the character of the fare arranged to be actuated by the manually operated means and means operated by the shifting means for rendering the manually operated means inoperative.

6. In a fare register for vehicles, an individual trip fare indicator, actuating mechanism therefor permanently connected thereto, an auxiliary indicator adapted to be operatively connected to the actuating mechanism of the individual trip fare indicator, clutch shifting means for operatively connecting the auxiliary indicator with and disconnecting it from the actuating mechanism, a sign operated by the clutch shifting means, and means for deferring the actuation of the two indicators for a predetermined period.

7. In a fare register for vehicles, an individual trip fare indicator, a driving shaft therefor having permanent operative connection therewith, a charge account indicator adapted to be operatively connected to the driving shaft, clutch shifting means for operatively connecting the charge account indicator with and disconnecting it from the driving shaft, a sign operated by the clutch shifting means, and clutch means between the actuating means and the driving shaft adapted to defer the actuation of the driving shaft for a predetermined period.

8. In a fare register for vehicles, a fare indicator, a driving shaft for the fare indicator, a charge account indicator, means for operatively connecting the charge account indicator to and disconnecting it from the driving shaft, an abutment device on the driving shaft, actuating means for the driving shaft including an engaging member adapted to engage the abutment device, and means for releasing the engaging member from and permitting it to pass the abutment device as the fare register is thrown out of operation.

9. In a fare register for vehicles, a fare indicator, a driving shaft for the fare indicator, a charge account indicator, means for operatively connecting the charge account indicator to and disconnecting it from the driving shaft, a pin-wheel on the driving shaft, actuating means for the driving shaft including a clutch wheel coöperating with the pin-wheel, a clutch on the pin-wheel adapted to engage a pin on the pin-wheel and rotate the pin-wheel with the clutch-wheel, means tending to force the clutch ahead of the pin, and means for releasing the clutch from the pin and permitting it to pass the pin as the fare register is thrown out of operation and for returning it into the path of the pin as the register is thrown into operation.

10. In a fare register for vehicles, in combination with a sign shaft, a fare indicator, a driving shaft for the fare indicator, a charge account indicator, manually operated means for operatively connecting the charge account indicator to and disconnecting it from the driving shaft, means actuated by the rotation of the sign shaft for rendering the manually operated means inoperative, an abutment device on the driving shaft, actuating means for the driving shaft including an engaging member adapted to engage the abutment device, and means for releasing the engaging member from and permitting it to pass the abutment device as the fare register is thrown out of operation.

11. In a fare register for vehicles, in combination with a sign shaft, a fare indicator, a driving shaft for the fare indicator, a charge account indicator, manually operated means for operatively connecting the charge account indicator to and disconnecting it from the driving shaft, means actuated by the rotation of the sign shaft for rendering the manually operated means inoperative, a pin-wheel on the driving shaft, actuating means for the driving shaft including a clutch wheel coöperating with the pin-wheel, a clutch on the pin-wheel adapted to engage a pin on the pin-wheel and rotate the pin-wheel with the clutch wheel, means tending to force the clutch ahead of the pin and means for releasing the clutch from the pin and permitting it to pass the pin as the fare register is thrown out of operation and for returning it into the path of the pin as the register is thrown into operation.

12. In a fare register for vehicles, in combination with a sign shaft, a registering mechanism, actuating means for the registering mechanism, means actuated by the rotation of the sign shaft for resetting the registering mechanism to its initial setting, an abutment device on the registering mechanism, a stop device movable into and out of the path of the abutment device, and means controlled by the movement of the sign shaft for moving the stop device into and out of the path of the abutment device.

13. In a fare register for vehicles, in combination with a sign shaft, a rotary registering mechanism, including a number-wheel, actuating means for the registering mechanism, means actuated by the rotation of the sign shaft for resetting the number wheel to its initial setting, an abutment device on the number-wheel, a stop device movable into and out of the path of the abutment device, and means controlled by the movement of the sign shaft for moving the stop device into and out of the path of the abutment device.

14. In a fare register for vehicles, in combination with a sign shaft, a registering mechanism including a plurality of number wheels, actuating means for the registering mechanism, means actuated by the rotation of the sign shaft for resetting the number wheels to their initial setting, an abutment device on the periphery of each number wheel, a stop device movable into and out of the path of the abutment devices, and means for moving the stop device into and out of the path of the abutment devices.

15. In a fare register for vehicles, in combination with a sign shaft, a registering mechanism, actuating means for the registering mechanism, means actuated by the rotation of the sign shaft for resetting the registering mechanism to its initial setting, an abutment device on the registering mechanism, a stop device movable into and out of the path of the abutment device, and means operated by the movement of the sign shaft for moving the stop device into the path of the abutment device during the resetting movement of the registering mechanism and for moving it out of the path thereof at the end of the resetting movement and for holding it out of the path thereof during the operative condition of the fare register.

16. In a fare register for vehicles, in combination with a sign shaft, a registering mechanism including a plurality of number wheels, actuating means for the registering mechanism, means actuated by the rotation of the sign shaft for resetting the number wheels to their initial setting, an abutment device on the periphery of each number wheel, a stop device movable into and out of the path of the abutment device, and means operated by the movement of the sign shaft for moving the stop device into the path of the abutment device during the resetting movement of the registering mechanism and for moving it out of the path thereof at the end of the resetting movement and for holding it out of the path thereof during the operative condition of the fare register.

17. In a fare register for vehicles, in combination with a sign shaft, a registering mechanism including a plurality of number wheels, actuating means for the registering mechanism, means actuated by the rotation of the sign shaft for resetting the number wheels to their initial setting, an abutment device on the periphery of each number wheel, a stop device normally situated in the path of the abutment devices, and a cam actuated by the resetting means and arranged to remove the stop device from the path of the abutment devices at the beginning of the resetting movement.

18. In a fare register for vehicles, in combination with a sign shaft, a registering mechanism including a plurality of number wheels, actuating means for the registering mechanism, means actuated by the rotation of the sign shaft for resetting the number wheels to their initial setting, an abutment device on the periphery of each number wheel, a lever having a laterally projecting stop-arm adapted to extend across the peripheries of the number wheels, resilient means tending to hold the stop-arm in the path of the abutment devices, and a cam actuated by the resetting means and arranged to remove the stop-arm from the path of the abutment devices at the beginning of the resetting movement.

19. In a fare register for vehicles, in combination with a sign shaft, a fare registering mechanism including a plurality of number wheels, actuating means for the registering mechanism, means actuated by the rotation of the sign shaft for resetting the number wheels to their initial setting, an abutment device on the periphery of each number wheel, a lever having a laterally projecting stop-arm adapted to extend across the peripheries of the number wheels, resilient means tending to hold the stop-arm in the path of the abutment devices, a cam actuated by the resetting means and arranged to remove the stop-arm from the path of the abutment device at the beginning of the resetting movement, and means actuated by the rotation of the sign shaft adapted to engage the lever and remove the stop-arm from the path of the abutment devices when the fare register is thrown into operative condition and to hold the stop-arm out during such condition of the fare register.

20. In a fare register for vehicles, in combination with a sign shaft, an extras indicator, manually operated means for setting the extras indicator, means normally locking the manual means, and means operated by the rotation of the sign shaft for unlocking the locking means.

21. In a fare register for vehicles, in combination with a sign shaft and shifting means operated by the rotation of the sign shaft for throwing the fare register into and out of operative condition, an extras indicator, manually operated rotary means for setting the extras indicator, a ratchet on the rotary means, a spring pressed pawl normally engaging in the ratchet and locking the rotary means against setting movement, and means operated by the shifting means when the sign shaft is rotated to throw the fare register into operation for disengaging the pawl from the ratchet.

22. In a fare register for vehicles, in combination with a sign shaft and a shifting lever operated by the sign shaft for throwing the fare register into and out of operative condition, an extras indicator, manually operated rotary means for setting the extras indicator, a ratchet on the rotary means, a spring pressed pawl normally engaging in the ratchet and locking the rotary means against setting movement, and a pin on the shifting lever operative when the lever is shifted to throw the fare register into operation to disengage the pawl from the ratchet.

23. In a fare register for vehicles, an extras indicator, a fare-and-extras indicator, manually operated rotary means for setting the extras indicator, a normally retracted actuating member adapted to engage and actuate the fare-and-extras indicator, and an engaging device on the rotary means adapted to engage and actuate the actuating member when the rotary means are operated.

24. In a fare register for vehicles, an extras indicator, a fare-and-extras indicator, manually operated rotary means for setting the extras indicator including a pinion having a pin thereon and a normally retracted actuating member adapted to engage and actuate the fare-and-extras indicator and arranged to be engaged and actuated by the pin as the pinion is rotated.

25. In a fare register for vehicles, an extras indicator, a fare-and-extras indicator, manually operated rotary means for setting the extras indicator including a pinion having a plurality of pins thereon, and a normally retracted actuating member adapted to engage and actuate the fare-and-extras indicator and arranged to be engaged and actuated by each of the pins as the pinion is rotated.

In testimony whereof I have affixed my signature in presence of two witnesses.

BERNHARD VOLKMAR.

Witnesses:
VICTOR D. BORST,
BERNARD COWEN.